(12) United States Patent
Corazza et al.

(10) Patent No.: US 9,650,213 B2
(45) Date of Patent: May 16, 2017

(54) DISTRIBUTING SYSTEM FOR A UNIT FOR TRANSFERRING SEALED PACKAGES

(71) Applicant: TETRA LAVAL HOLDINGS & FINANCE S.A., Pully (CH)

(72) Inventors: Federico Corazza, Bologna (IT); Sandro Bernini, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/900,850

(22) PCT Filed: Jun. 10, 2014

(86) PCT No.: PCT/EP2014/062013
§ 371 (c)(1),
(2) Date: Dec. 22, 2015

(87) PCT Pub. No.: WO2014/206718
PCT Pub. Date: Dec. 31, 2014

(65) Prior Publication Data
US 2016/0137425 A1    May 19, 2016

(30) Foreign Application Priority Data
Jun. 28, 2013  (EP) .................................. 13174197

(51) Int. Cl.
*B65G 47/26*  (2006.01)
*B65G 47/30*  (2006.01)
(Continued)

(52) U.S. Cl.
CPC ........... *B65G 47/648* (2013.01); *B65G 47/30* (2013.01); *B65G 47/71* (2013.01); *B65G 2201/0235* (2013.01)

(58) Field of Classification Search
CPC ........ B65G 47/71; B65G 21/14; B65G 47/30; B65G 2201/0235
(Continued)

(56) References Cited

U.S. PATENT DOCUMENTS 6,164,045 A * 12/2000 Focke ..................... B65B 5/105
                                                                198/429
7,306,087 B1 * 12/2007 Hamsten .............. B65G 47/715
                                                                198/369.5

FOREIGN PATENT DOCUMENTS

EP    0 480 436 A2    4/1992
EP    1 439 140 A1    7/2004
(Continued)

OTHER PUBLICATIONS

International Search Report (PCT/ISA/210) mailed on Sep. 2, 2014, by the European Patent Office as the International Searching Authority for International Application No. PCT/EP2014/062013.
(Continued)

*Primary Examiner* — James R Bidwell
(74) *Attorney, Agent, or Firm* — Buchanan Ingersoll & Rooney PC

(57) ABSTRACT

There is disclosed a distributing system for distributing articles, comprising a channel for conveying articles and which extends from an input opening to an output opening adapted to output articles along a first direction; channel comprises a first portion which defines input opening; and a second portion which defines output opening and is articulated with respect to first portion; output opening is movable along a second direction transversal to first direction; first portion may be arranged, in use, sloped relative to first direction as a result of the movement of output opening along second direction; distributing system comprises a pair of first conveyors and a pair of respective second conveyors
(Continued)

which define first portion of channel; each first conveyor is free to slide with respect to respective second conveyor.

18 Claims, 7 Drawing Sheets

(51) Int. Cl.
  *B65G 47/64* (2006.01)
  *B65G 47/71* (2006.01)
(58) Field of Classification Search
  USPC .. 198/457.03, 457.06, 456, 626.5, 429, 432, 198/861.6
  See application file for complete search history.

(56) References Cited

FOREIGN PATENT DOCUMENTS

| | | | |
|---|---|---|---|
| EP | 2 594 512 A1 | 5/2013 | |
| EP | 2818435 | * 12/2014 | ............. B65G 47/71 |

OTHER PUBLICATIONS

Written Opinion (PCT/ISA/237) mailed on Sep. 2, 2014, by the European Patent Office as the International Searching Authority for International Application No. PCT/EP2014/062013.

* cited by examiner

DISTRIBUTING SYSTEM FOR A UNIT FOR TRANSFERRING SEALED PACKAGES

TECHNICAL FIELD

The present invention relates to a distributing system for a unit for transferring sealed packages from a single channel to multiple channels.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled continuously downwards with the sterilized or sterile-processed food product, and is sealed and then cut along equally spaced cross sections to form pillow packs, which are then fed to a folding unit to form the finished, e.g. substantially parallelepiped-shaped packages.

The folding unit generally outputs a single row, which is formed by a queue of packages.

A transferring unit is arranged downstream from the folding station, is fed with the single row by an input line and selectively feeds the packages to a plurality of output lines.

Still more precisely, the transferring unit transfers the packages from the input line to one prescribed output line.

The input line and the output lines extend along a first direction. The output lines are parallel to each other and are aligned along a second direction, which is orthogonal to the first direction.

An example of the transferring unit is known from EP-A-1439140.

An embodiment of transferring unit known from EP-A-1439140 substantially comprises:

- an active conveyor, which is movable along the first direction and is interposed between the input line and the output lines;
- a belt sequencing device, which accelerates, one after the other, the packages of the queue, so as to separate them by gap; and
- a distributing system, which is interposed between the sequencing device and the output lines.

In greater detail, the distributing system defines a conveying channel for the separated packages. The channel has a fixed input opening fed by the sequencing device with the single row of separated packages, and an output opening. The output opening is movable relative to the input opening parallel to both the first direction and to the second direction, so as to be aligned with the prescribed output line along the first direction.

The distributing system substantially comprises, proceeding from the input opening to the output opening of the channel:

- a pair of first conveyors facing each other and defining the input station of the channel; and
- a pair of second conveyors facing each other, and each comprising a first portion and a second portion.

In detail, each first conveyor has a first end hinged to a frame about a first axis, and a second end hinged to the first portion of the respective second conveyor about a second axis. First axes and second axes are orthogonal to the first direction and the second direction and vertical.

The second portions of the second conveyors define, on the opposite side of the respective first portion of the second conveyors, the output opening of the channel.

Furthermore, the second portion of each second conveyor may be retracted or extended relative to the corresponding first portion and along the first direction.

In particular, both the first conveyors and the second conveyors are belt conveyors.

Still more precisely, the transferring unit of EP-A-1439140 comprises:

- a first motor, which is connected to both the first portions of the second conveyors, and which integrally displaces the first portions along the second direction towards the prescribed output line, so causing the first conveyors to be angled with respect to the first direction and to rotate about the first axes and the second axes; and
- a second motor, which is connected to both the second portions of the second conveyors, and which integrally displaces the second portions along the first direction, so as to extend or retract the second portions from/into the respective first portions.

In particular, the first motor and the second motor are fixed to a frame of the transferring unit.

The operation of the first motor and the second motor arranges the first conveyors with a given angle relative to the first direction, whereas the second conveyors remain parallel to the first direction and are aligned with the prescribed output line.

In other words, the angle between the input line and the prescribed output line is recovered by the inclination of the first conveyors with respect to the first direction.

Moreover, the first conveyors remain parallel to each other, because they are hinged at their first and second ends to the frame and the distance between the second conveyors is kept constant. In other words, the first conveyors form an articulated parallelogram.

Accordingly, the distance between the first conveyors varies with the position of the output opening of the channel along the second direction.

As a consequence, the width of the channel in the region defined by the first conveyors varies with the position of the output opening along the second direction.

That variation of the width of the channel generates the risk that the packages change their orientation, when conveyed by the first conveyors.

This is because the width of the channel corresponds to the width of the packages, only for a given inclination angle of the first conveyors relative to the first direction.

Accordingly, when the angle of the first conveyors relative to the first direction is different from the given one, the packages are no longer fully controlled by the first conveyors.

In order to contain that risk, the transferring unit of EP-A-1439140 has a very long channel and the first and the second conveyors have thick belts.

A need is felt within the industry to render the orientation of the packages as controllable as possible, while reducing the length of the distributing assembly and/or without relying on thick belts.

Furthermore, a need is felt within the industry to reduce the variations of angles of the channel with respect to the first direction, in order to further reduce the risk that the orientation of the packages varies.

The transferring unit of EP-A-1439140 also comprises a third motor, which drives in rotation a pairs of pulleys of the first conveyors.

These pulleys are arranged close to the input station of the channels. Furthermore, the belts of the first conveyors drive the belts of the second conveyors.

Accordingly, the packages, when travelling along the channel from the input opening to the output opening, cooperate with driven branches of the belts of the first conveyors and the second conveyors.

A need is also felt within the industry to increase the belt tension of the branches of the first and the second conveyors which cooperate with the packages.

Finally, the belts of the sequencing device are spaced from the belts of the distributing system.

Accordingly, the packages are not continuously guided, when transferred from the sequencing device to the distributing system.

A need is therefore felt within the industry to continuously guide the packages, when the latter are transferred from the sequencing device to the distributing system.

DISCLOSURE OF INVENTION

It is an object of the present invention to provide a distributing system for a unit for transferring sealed packages, designed to meet at least one of the above needs in a straightforward, low-cost manner.

According to the present invention, there is provided a distributing system for a unit for transferring sealed packages, as claimed in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
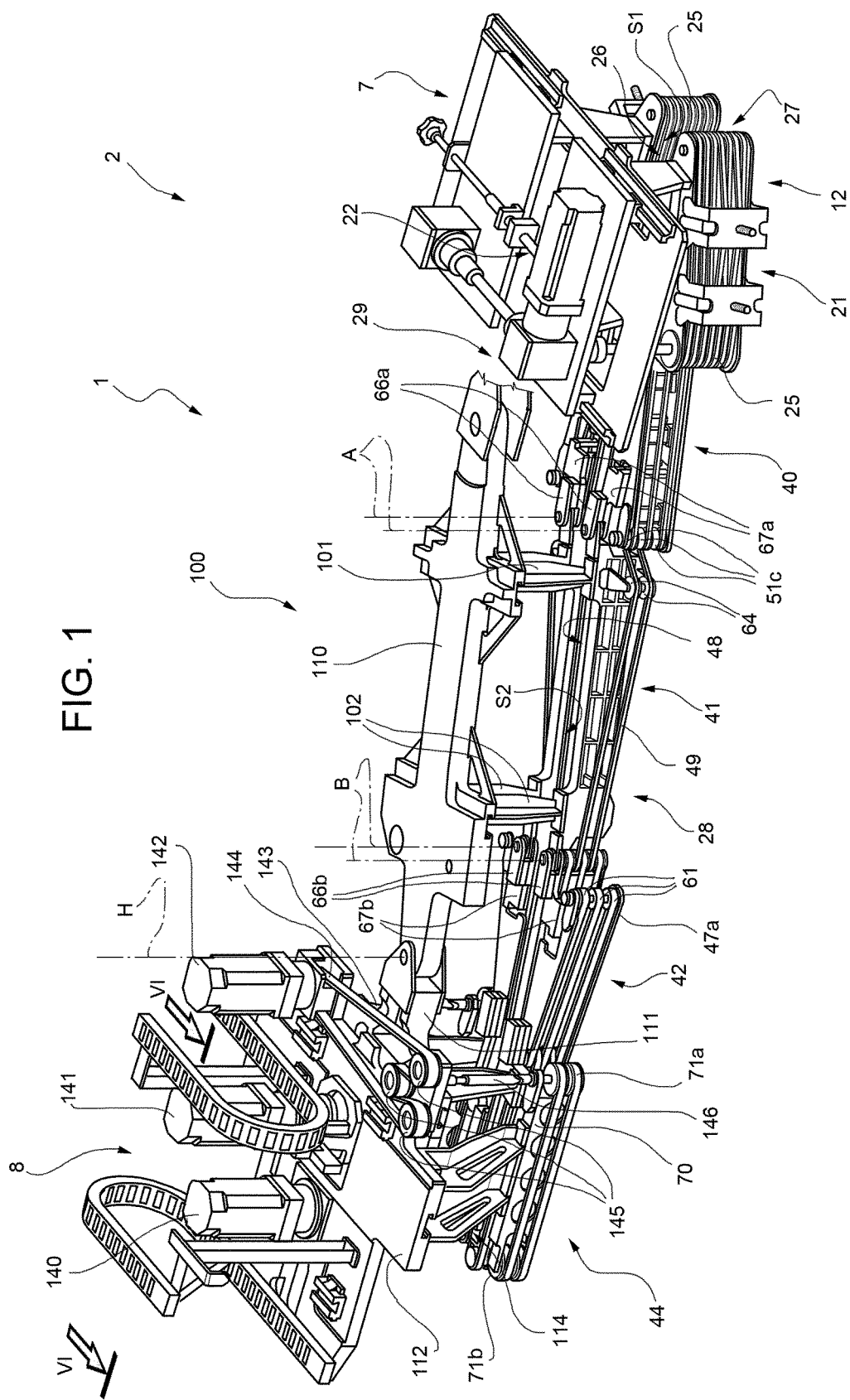
FIG. 1 is a perspective view of the distributing system in accordance with the present invention.
Figure 2:
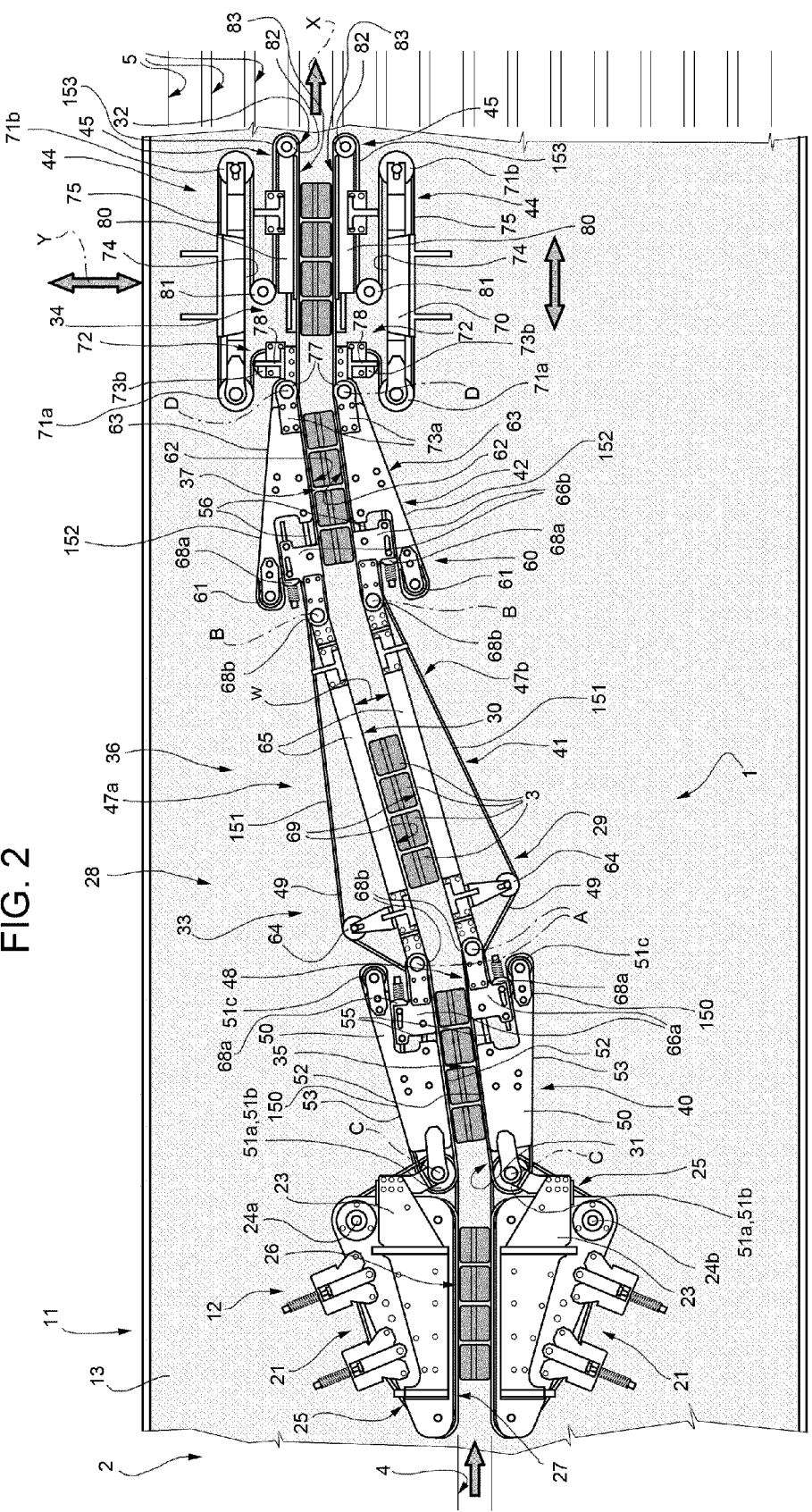
FIG. 2 is a top view of the distributing system of FIG. 1, with parts removed for clarity.
Figure 3:
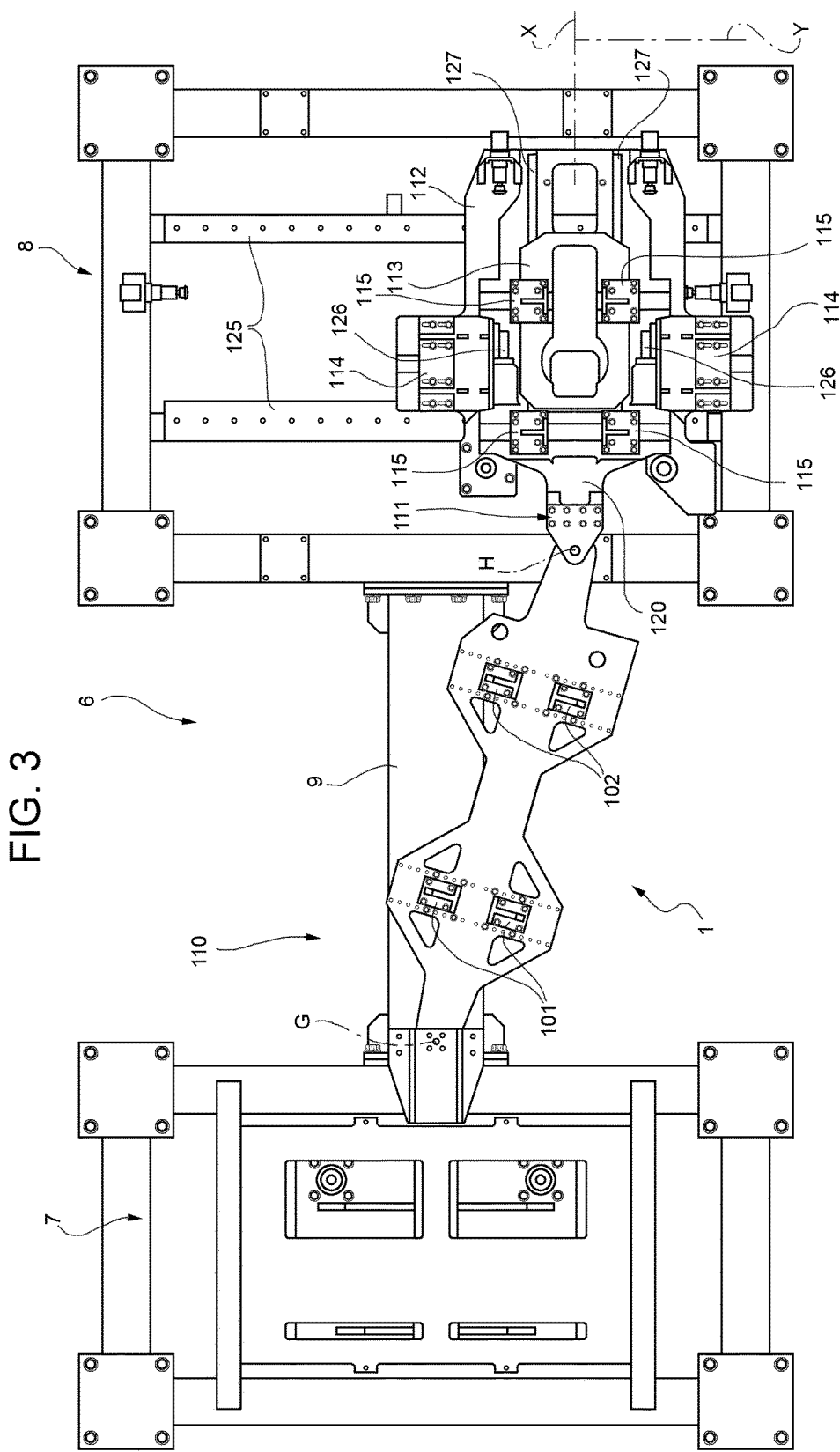
FIG. 3 is a bottom view of the distributing system of FIGS. 1 and 2, with parts removed for clarity.

Number 1 in FIGS. 1 to 3 indicates as a whole a distributing system adapted to be incorporated in a unit 2 for transferring articles from a single input line 4 to a plurality of output lines 5. Still more precisely, distributing system 1 selectively transfers the articles from input line 4 to a prescribed output line 5.

In the embodiment shown, the articles are sealed packages 3 filled with a pourable food product.

In greater detail, line 4 extends along a direction X, horizontal in use, and advances a plurality of packages 3 coming out from a not-shown machine. Lines 5 extend along direction X and are aligned along a direction Y orthogonal to direction X and horizontal, in the embodiment shown.

In greater detail, unit 2 comprises, proceeding from line 4 to lines 5, (FIGS. 2 and 3):

a frame 6;

an active conveyor 11, which is fed by input line 4 with a queue of packages 3;

a sequencing device 12, which interacts with packages 3 advanced by conveyor 11 and forms a single row of packages 3 separated by a gap therebetween and proceeding along direction X; and distributing system 1, which receives the single row of separated packages 3 by sequencing device 12, deviates that single row, and feeds them to the prescribed output line 5 parallel to direction X.

With reference to FIG. 3, frame 6 comprises:

a rear structure 7, which is fixed to the ground;

a forward structure 8, which is fixed to the ground and is on the opposite side of structure 7; and a rod 9 interposed between structures 7, 8.

Structures 7 and 8 comprise respective main portion which extends above and at a certain distance from conveyor 11, and rod 9 extends above and at certain distance from conveyor 11.

With reference to FIG. 2, conveyor 11 has an active surface 13 which lies in the plane defined by directions X, Y, moves parallel to direction X from input opening 4 to output openings 5, and cooperates and moves packages 3 parallel to direction X.

Sequencing device 12 comprises:

a pair of conveyors 21, belt conveyors in the embodiment shown; and a motor 22 fitted to structure 7 (FIG. 1).

Each conveyor 21 comprises, in turn:

a body 23 fitted to structure 7;

a plurality of pulley 24a, 24b rotatably fitted to body 23; and a plurality of belts 25 wounded onto pulleys 24a, 24b.

Belts 25 comprise respective active branches 26 which extend parallel to direction X and are spaced apart relative to direction Y.

Branches 26 are spaced from each other along direction Y and define therebetween a channel 27 parallel to direction X.

Motor 22 directly drives in rotation pulley 24a of one conveyor 21 and indirectly drives in rotation pulley 24b of other conveyor 21, so that branches 26 convey separated packages 3 inside channel 27, parallel to direction X and from input line 4 towards output lines 5.

Still more precisely, motor 22 is controlled, so that branches 26 are accelerated at a speed greater than the speed of packages 3 at input line 4.

In this way, sequencing device 12 forms a row of packages 3 aligned parallel to direction X and separated by a gap.

Distributing system 1 comprises:
- a first conveying line 28, which rests on surface 13; and
- a second conveying line 29 which extends substantially parallel to and spaced apart from conveying line 28 and rests on surface 13;
- a channel 30 defined by conveying lines 28, 29 and which conveys packages 3 from channel 27 of sequencing device 12 to the prescribed output line 5.

In greater detail, channel 30 comprises:
- a portion 33, which defines an input opening 31 fed by channel 27 with the row of sequenced packages 3 proceeding parallel to direction X and aligned with input line 4; and
- a portion 34, which defines an output opening 32 and outputs packages 3 along direction X and aligned with prescribed input line 5.

Channel 30 has a width w measured orthogonally to the extension direction of portion 33.

Still more precisely, opening 31 is stationary with respect to frame 6 while opening 32 may be moved, as it will be evident from the present description, along directions X, Y with respect to opening 31, so as to be aligned along direction X with the prescribed output line 5.

Accordingly, as a result of the movement of opening 32 along directions X, Y, portion 33 of channel 30 may be sloped with respect to frame 6 and opening 31.

On the contrary, portion 34 remains parallel to direction X, when opening 32 moves along directions X, Y.

In other words, the angle defined between the ideal line joining input line 4 and prescribed output lines 5, and direction X is recovered by portion 33 of channel 30.

In greater detail, each conveying line 28, 29 comprises:
- respective conveyors 40, 41, 42 which define portion 33 of channel 30; and
- respective conveyors 44, 45 which define portion 34 of channel 30.

Conveyors 40, 41, 42, 44, 45 of the same pair face one another and are spaced apart from one another.

Advantageously, conveyors 40, 41 and 41, 42 of each conveying line 28, 29 may slide relative to each other.

Furthermore, conveyors 40, 41 of each conveying line 28, 29 may rotate relative to each other about respective axes A and conveyors 41, 42 of each conveying line 28, 29 may rotate about respective axes B parallel to axes A.

Conveyors 40 are also hinged to structure 7 about respective axes C.

Conveyors 42 are also hinged to conveyors 44 about respective axes D.

Portion 33 of channel 30 comprises, proceeding from opening 31 towards opening 32:
- a stretch 35 bounded by conveyors 40 and parallel to conveyors 40;
- a stretch 36 bounded by conveyors 41 and parallel to conveyors 41; and
- a stretch 37 bounded by conveyors 42 and parallel to conveyors 42.

Figure 7:
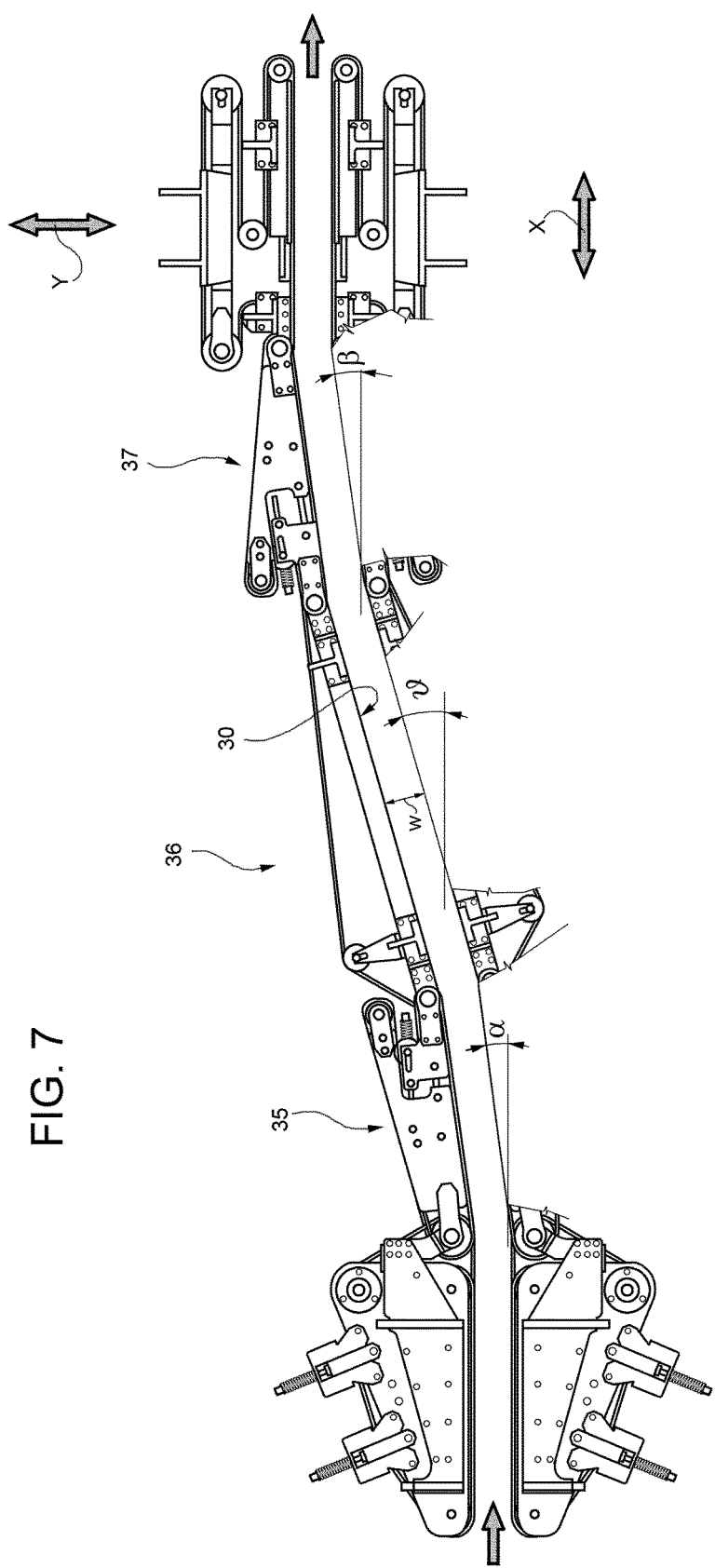
FIG. 7 is a schematic view of FIG. 1, with parts removed for clarity.

The extension direction of stretch 35 and direction X define an angle α; the extension direction of stretch 36 and direction X define an angle θ; and the extension direction of stretch 37 and direction X define an angle β (FIG. 7).

Angles α, β and θ vary with the position of opening 32 along directions X, Y.

In the embodiment shown, angles α, β are equal and equals each the half of angle θ.

Conveyors 44, 45 are integrally movable with respect to conveyors 40, 41, 42 along direction Y.

Conveyor 45 is movable with respect to conveyor 44 along direction X, so as to approach opening 32 to prescribed output line 5.

Conveyors 45 are interposed between conveyors 44 along direction Y.

In the embodiment shown, axes A, B, C and D are vertical.

Conveyors 40, 41, 42, 44, 45 of each conveying line 28, 29 are, in the embodiment shown, belt conveyors.

Still more precisely, conveyors 40, 41, 42, 44, 45 of each conveying line 28, 29 advance a pair of respective belt assemblies 47a, 47b.

Each belt assembly 47a, 47b comprises a respective active branch 48 which cooperate with and moves packages 3 advancing inside channel 30 and a return branch 49.

In particular, branches 26 of belts 25 and branches of corresponding belt assemblies 47a, 47b define a corresponding continuous guide surface S1, S2 for packages 3, which travel inside channels 27, 30 (FIG. 1).

In this way, packages 3 are continuously conveyed by active branches 26, 48, when they move from channel 27 to channel 30.

Each conveyor 40 comprises, in detail:
- a body 50 which is hinged to structure 7 about respective axis C and may slide on active surface 13;
- a plurality of rearmost pulleys 51a, 51b and one forwardmost pulley 51c rotatably mounted onto body 50 about respective axes parallel to axis A, B, C and onto which respective belt assemblies 47a, 47b are wound; and
- a piston 55 protruding from body 50 on the opposite side of axis C and coupled with respective conveyor 41 as it will be disclosed in the following of the present description.

Each body 50 comprises a wall 52 which bounds a stretch 35 of portion 33, and a wall 53 opposite to wall 52.

In the embodiment shown, each body 50 is L-shaped and has an increasing thickness measured orthogonally to channel 30, proceeding from opening 31 towards opening 32.

Pulleys 51a and 51b are rotatable coaxially about respective axes C, and are free to rotate relative to each other.

In particular, belts 25 of conveyors 21 wind onto respective pulleys 51b while belt assemblies 47a, 47b wind onto pulleys 51a. In this way, belts 25 and belt assemblies 47a, 47b are driven independently from each other.

Pulleys 51a, 51b are arranged at opening 31 of channel 30 whereas pulleys 51c protrudes from body 50 on the opposite side of channel 30.

Each conveyor 42 comprises:
- a body 60 which is hinged to respective conveyor about respective axis D and may slide on active surface 13;
- a pulley 61 rotatably mounted onto body 60 about respective axes parallel to axis A, B, C and on the opposite side of conveyor 44; and
- a piston 56 protruding from body 60 on the opposite side of axis D and coupled with respective conveyor 41 as it will be disclosed in the following of the present description.

Each body 60 comprises a wall 62 which bounds stretch 37 of portion 33, and a wall 63 opposite to wall 62.

In the embodiment shown, each body 60 is L-shaped and has a decreasing thickness measured orthogonally to channel 30, proceeding according to the advancing sense of packages 3 inside channel 30.

Each conveyor 41 is interposed between respective conveyors 40, 42 and comprises, in turn:
- a rod 65 onto which a portion of active branch 48 of respective belt assemblies 47a, 47b may move;
- a pair of elements 66a, 66b (FIG. 1) hinged to rod 65 with respect to axes A, B and on respective opposite sides of rod 65; and
- a pair of arms 67a, 67b (FIG. 1) each of which protrudes from respective element 66a, 66b on the opposite side of channel 30 and is slidably coupled with respective piston 55, 56 of respective conveyors 40, 42.

Rod 65 of each conveyor 41 comprises a wall 69, which bounds stretch 36 of portion 33.

Rod 65 further supports a group of pulleys 64 on the opposite side of wall 69 relative to channel 30.

Each element 66a, 66b supports relative pulleys 68a rotatably about respective axes parallel to axes A, B.

Each arm 67a, 67b supports relative pulleys 68b rotatably about respective axes parallel to axes A, B (FIG. 2).

Figure 4:
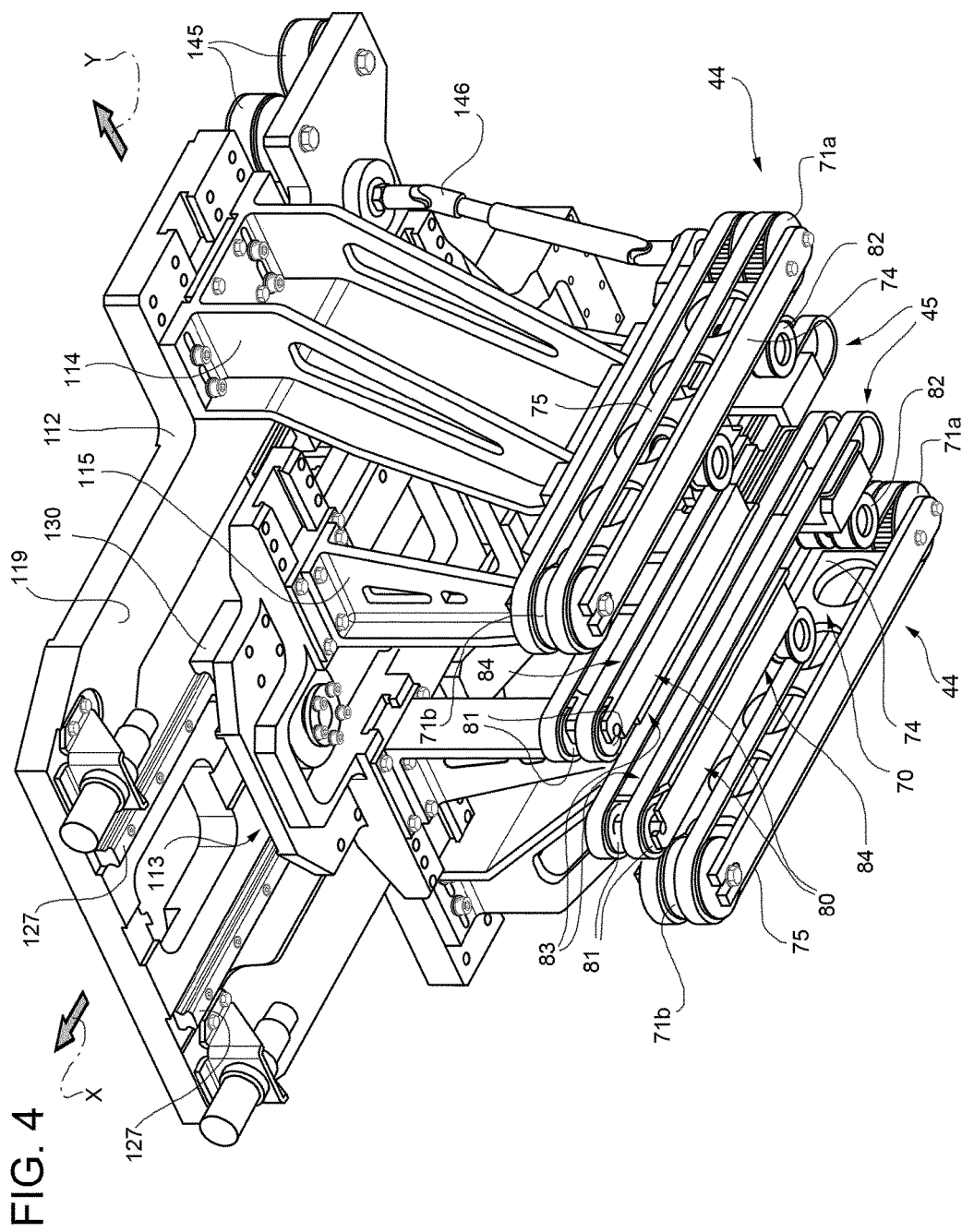
FIG. 4 shows a first group of the distributing system of FIGS. 1 to 3.

Each conveyor 44 comprises, in turn, (FIG. 4):
- a rod 70 elongated parallel to direction X, spaced from channel 30 along direction Y, and which may slide on active surface 13; and
- a pair of rear pulleys 71a and of a pair of forward pulleys 71b, which may rotate relative to rod 70 about respective axes parallel to axis A, B, C, D and move together with rod 70 along direction Y.

Rod 70 of each conveyor 44 comprises:
a wall 74 on the side of channel 30; and
a wall 75 on the opposite side of channel 30.

Furthermore, each conveying line 28, 29 comprises a connecting element 72 formed by (FIG. 2):
- an arm 73a, which is hinged to body 60 of conveyor 42 about respective axis D and which rotatably support a relative pulley 77 about respective axis D; and
- an arm 73b integrally protruding from arm 73a on the opposite side of channel 30 and which rotatably supports a relative pulley 78 about a respective axis parallel to axes A, B, C, D.

In particular, each connecting element 72 bounds, on the opposite side of rod 70, an end of portion 34 of channel 30 which is opposite to opening 32.

Each conveyor 45 comprises (FIG. 4):
- a rod 80 elongated parallel to direction X and defining opening 32 of channel 30; and
- two pairs of forwardmost and rearmost pulleys 81, 82 rotatably mounted on rod 80 about an axis parallel to axis A, B, C, D.

Rod 80 comprises a wall 83 bounding channel 30 at opening 32 and a wall 84 opposite to wall 83 with respect to direction Y.

Pulleys 81, 82 are arranged on opposite sides of rod 80.

Each belt assembly 47a, 47b comprises, in turn:
- a pair of belts 150, each of which is wound onto pulleys 51a, 51c, 68a (of respective element 66a), 68b (of respective arm 67a) of respective conveying line 28, 29, and the active branch of which conveys package 3 along stretch 35 of channel 33;
- a pair of belts 151, each of which is wound onto pulleys 68b (of respective arm 67a), 64, 68b (of respective arm 67b) of respective conveying line 28, 29, and the active branch of which conveys package 3 along stretch 36 of channel 33;
- a pair of belts 152, each of which is wound onto pulleys 61, 68a (of respective element 66b), 68b (of respective arm 67b), 77 of respective conveying line 28, 29, and the active branch of which conveys packages 3 along stretch 36 of channel 30; and
- a pair of belts 153, each of which is wound onto pulleys 77, 78, 71a, 71b, 81, 82 and the active branches of which conveys packages 3 along portion 34 of channel 30.

In other words, belt 150, 152 are wound onto a plurality of fixed axes pulleys 51a, 51c; 61, 77 fitted to body 40, 60 and onto movable-axes pulleys 68a, 68b (of respective elements 66a, 66b) which can slide relative to pulleys 51a, 51c; 61, 77, As a result, when conveyors 41 and 40, 42 slide relative to each other, the length of the active branches of relative belts 150, 152 can vary accordingly.

In the very same way, belts 153 are wound onto a plurality of pulleys 73b, 71a, 71b stationary along direction X and with respect to bodies 70, and onto pulleys 81, 82 which are movable along direction X relative to corresponding pulleys 73b, 71a, 71b.

As a result, when conveyors 45 slide relative to corresponding conveyors 44, the length of the active branches of belts 153 can vary accordingly.

In particular, belts 150, 151, 152, 153 of each belt assembly 47a, 47b are operatively connected to each other. Still more precisely, for each belt assembly 47a, 47b, belts 150, 151 are wound onto common pulleys 68b of respective element 66a, and belts 151, 152 are wound onto common pulleys 68b of respective element 66b. Belts 152, 153 are wound onto common pulleys 77.

Active branch 48 of each belt assembly 47a, 47b is supported, proceeding from opening 31 to opening 32 according to the advancing direction of packages 3 inside channel 30, by (FIGS. 1 and 2):
rearmost pulley 51a of respective body 50;
wall 52 of respective body 50;
element 66a of respective conveyor 41;
wall 69 of respective rod 65;
element 66b of respective conveyors 41;
wall 62 of respective body 60;
respective connecting element 72; and
wall 83 of respective rod 80.

Return branch 49 of each belt assembly 47a, 47b is supported, proceeding from opening 32 to opening 31, according to the return direction of branches 49, by:
pulley 82, wall 83 and pulley 81 of conveyor 45;
a portion of wall 74, which is interposed between pulley 81 and pulley 71b of respective conveyor 44;
pulley 71b, wall 75 and pulleys 71a of respective conveyor 44;
pulley 78, 77 of respective connecting element 72;
wall 63 and pulley 61 of respective body 60;
pulleys 68b of respective connecting element 66b;
pulleys 64 of respective conveyor 41;
pulleys 68a of respective connecting element 66a; and
pulley 51c and wall 53 of respective body 50.

Distributor system 1 further comprises a constraining assembly 100 for constraining conveying lines 28, 29 to one another.

Advantageously, constraining assembly 100 comprises (FIGS. 1 and 3):
two connecting elements 101 connected to each other and connected to respective rods 65; and
two connecting elements 102 connected to each other and connected to respective rods 65.

Still more precisely, connecting elements 101, 102 are rigidly connected to respective portions of rods 65 in a position interposed between respective axes A, B.

Connecting elements 101, 102 extend, in the embodiment shown, along respective vertical directions.

Connecting elements 101 are spaced parallel to width w of channel 30. In the very same way, connecting elements 102 are spaced parallel to width w of channel 30.

In this way, width w of stretch 36 of channel 30 bounded between conveyors 41 is constant, in the embodiment shown.

Constraining assembly 100 comprises, in turn, proceeding from structure 7 towards structure 8 of frame 6,
- a crossbar 110 which is hinged to structure 7 of frame 6 about an axis G and is connected to rods 65 of conveyor 41 through connecting elements 101, 102;
- a fork 111 which is hinged to crossbar 110 about an axis H;
- a slide 112 which is slidably coupled with fork 111 with respect to direction X and with structure 8 of frame 6 along direction Y, and which is rigidly connected with rods 70 of conveyors 44; and
- a slide 113 which is slidably coupled with slide 112 along direction X and is integrally movable with slide 112 along direction Y, and is rigidly connected to rods 80 of conveyors 45, so as to allow conveyors 45 to move integral with conveyors 44 along direction Y and to slide with respect to corresponding conveyors 44 along direction X.

In this way, the movement of slide 112 along direction Y with respect to frame 6 displaces both conveyors 44, 45 along direction Y integrally to each other, so as to align output opening 32 of channel 30 with prescribed output line 5.

The movements of slide 113 along direction X with respect to slide 112 moves conveyors 45 along direction X with respect to conveyor 44, so as to approach or move away output opening 32 to/from prescribed output line 5.

Slide 112 is rigidly connected to rods 70 of conveyor 44 by a pair of respective vertical connecting elements 114.

Slide 113 is rigidly connected to each rod 80 of conveyor 45 by two pair of respective vertical connecting elements 115, which are spaced along direction X.

Axes G and H are parallel to axes A, B, C, D, and, in the embodiment shown, vertical.

Figure 5:
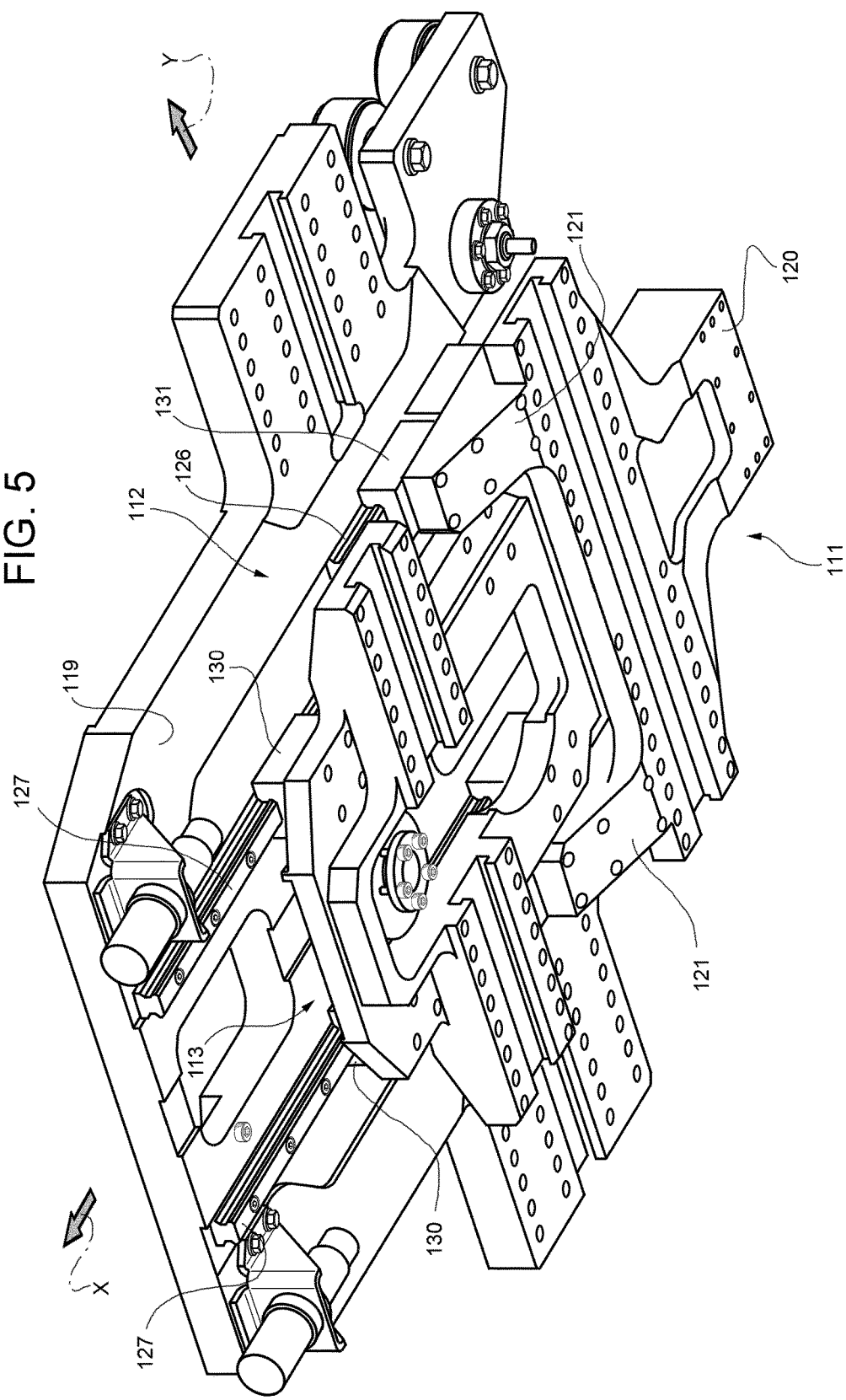
FIG. 5 shows a second group of the distributing system of FIGS. 1 and 2.

Fork 111 substantially comprises (FIGS. 3 and 5):
- a body 120 hinged to crossbar 110 about axis H; and
- a pair of arms 121 protruding from body 120 along direction X and spaced from one other along direction Y.

Slide 112 is shaped as plate and is slidably coupled along direction Y onto a pair of guides 125 (visible in FIG. 3) carried by structure 8 of frame 6.

Furthermore, slide 112 comprises (FIG. 5):
- a pair of guides 126 parallel to each other, elongated parallel to direction X and onto which respective carriers 131 integral with arms 121 of fork 111 may slide parallel to direction X; and
- a pair of guides 127 parallel to each other, elongated parallel to direction X and onto which slide 113 may slide parallel to direction X.

Guides 125 are arranged on the opposite side of slide 112 relative to channel 30.

Guides 126 and 127 are fixed to a surface 119 of slide 112 facing channel 30 and opposite relative to guides 125.

Guides 126 are interposed along direction X between guides 127 and crossbar 110.

Slide 113 defines, on the side of slide 112, a pair of carriages 130 which slide along direction X with respect to slide 112 along respective guides 127.

Figure 6:
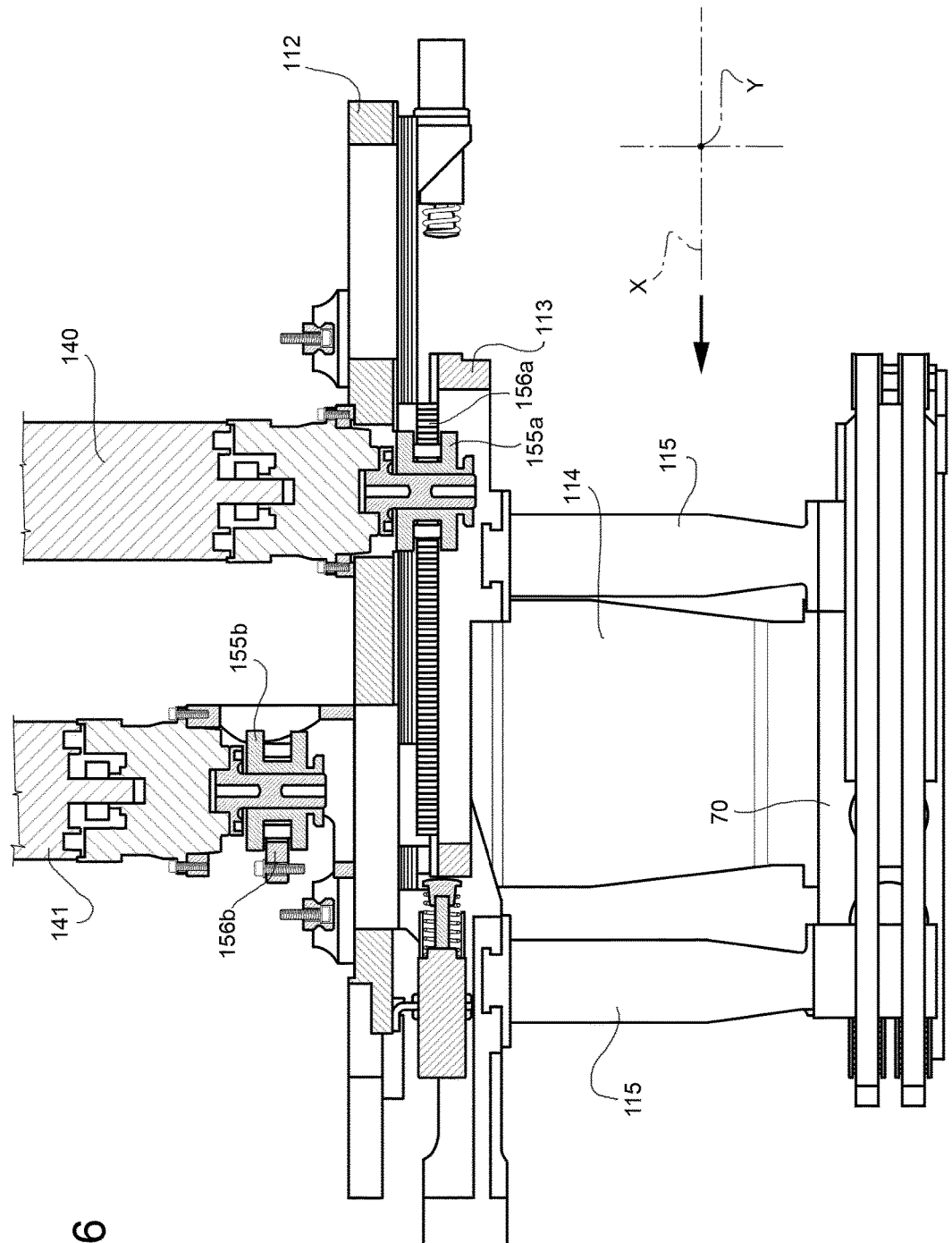
FIG. 6 is a section along line VI-VI of FIG. 1.

Distributing system 1 also comprises (FIGS. 1 and 6):
- a motor 141 fixed to slide 112 and operatively connected to slide 112 to cause the movement of slide 112—and therefore of slide 113 and conveyors 44, 45—along direction Y onto guides 125 and with respect to structure 8 of frame 6; and
- a motor 140 fixed to slide 112 and operatively connected to slide 113 to cause the movement of slide 113—and, therefore, of conveyor 45—along direction X onto guides 127 and with respect to slide 112.

In the embodiment shown, motors 141, 140 are connected to respective slides 112, 113 through a pinion 155b, 155a fitted to an output shaft of motors 141, 140 and a rack 156b, 156a coupled with pinion 155b, 155a and fitted to respective slide 112, 113.

Rack 156a associated to motor 141 extends along direction Y and is fixed to slide 113. Rack 156b associated to motor 140 extends along direction X and is fixed to forward structure 8 of frame 6.

Distributing system 1 further comprises (FIGS. 1 and 4):
- a motor 142 fitted to slide 112 and which drives belt assemblies 47a, 47b;
- a joint 143 interposed between an output shaft of motor 142 and pulley 71a of one conveyor 44;
- a belt 144 driven by motor 142 and wound on a plurality of pulleys 145 having respective axes parallel to axes A, B, C, D; and
- a joint 146 interposed between one end pulley 145 and pulley 71a of the other conveyor 44.

In the embodiment shown, joints 143, 146 are articulated cardanic joints, so that the distance between conveyors 44 and corresponding conveyors 45 can be varied in case of change of format of packages 3.

Furthermore, in case of change of format of packages 3 and of corresponding change of width w of channel 30, the distance of connecting elements 101, 102; 114; 115 along direction Y may be regulated.

In the embodiment shown, constraining assembly 100 extends above and at certain distance from conveying lines 28, 29.

Still more precisely, crossbar 110 extends above conveyors 40, 41, 42 of conveying lines 28, 29; and fork 111 and slides 112, 113 extends above conveyors 44, 45 of conveying lines 28, 29.

In use, a row of packages 3 is fed by input line 4 to unit 2 parallel to direction X and without any gap therebetween.

Packages 3 are advanced by surface 13 of conveyor 11 parallel to direction X and up to reach sequencing device 12.

Motor 22 of sequencing device 12 drives belts 25 at a speed greater than the speed of packages 3 at input line 4.

In this way, a row of packages 3 separated by a gap and aligned along direction X with input line 4 is advanced by conveyor 13 from sequencing device 12 to distributing system 1.

Distributing system 1 receives separated packages 3 aligned with input line 4 at opening 31 by sequencing device 12, deviates separated packages 3 inside channel 30, and outputs at opening 32 separated packages 3 aligned with prescribed output line 5 along direction X.

In greater detail, packages 3 are continuously conveyed on surfaces S1, S2 defined by belts 25 of sequencing device 12 and respective belt assemblies 47a, 47b of distributing system 1.

Each belt 25 and relative belt assemblies 47a, 47b move independently from each other, because respective pulleys 51b, 51a are free to rotate with respect to each other.

The operation of motor 142 causes the movement of belt assemblies 47a, 47b. In particular, motor 142 drives joints 143, 146 which are connected to pulleys 71a of conveyors 44 and, therefore, to belt assemblies 47a, 47b.

Active branches 48 of belt assemblies 47a, 47b at first move package 3 inside stretches 35, 36, 37 of portion 33 of channel 30, defined by conveyors 40, 41, 42 of conveying lines 28, 29. Then, active branches 48 move packages 3 inside portion 34 of channel 30, which is defined by conveyors 45 of conveying lines 28, 29.

The simultaneous operation of motors 140, 141 integrally move conveyors 44, 45 along direction Y, so as to align opening 32 with prescribed line 5 along direction X; and simultaneously move conveyors 45 with respect to conveyor 44 along direction X, so as to approach/move away opening 32 to/from prescribed output line 5 along direction X.

In this way, opening 32 is moved along direction X, Y.

The above-described movements of opening 32 keep portion 34 of channel 30 parallel to direction X and slope portion 33 of channel 30 with respect to direction X.

In particular, the operation of motor 141 moves slide 112 along direction Y with respect to structure 8 of frame 6. Accordingly, conveyors 44 and slide 113 are moved along direction Y integrally with slide 112. Therefore, also conveyors 45 and opening 32 move along direction Y together with conveyors 44.

The operation of motor 140 causes slide 113 to move along guides 127 parallel to direction X with respect to slide 112.

Accordingly, conveyors 45 and, therefore, opening 32 are moved along direction X with respect to conveyor 44.

The above-described operation of motors 140, 141 and the resulting displacements of conveyors 44, 45 and opening 32 cause the following movements of constraining assembly 100 and of conveying lines 28, 29.

Crossbar 110 and connecting element 101, 102 rotate about axis G with respect to structure 7 of frame 6 and about axis H with respect to body 120 of fork 111.

Arms 121 of fork 111 slide on respective guides 126 parallel to direction X with respect to slide 112.

As far as conveying lines 28, 29 are concerned, connecting elements 72 move integrally with respective conveyors 44 along direction Y.

Each conveyor 42 rotates about respective axis D with respect to respective connecting element 72; corresponding conveyors 41, 42 rotate with respect to each other about respective axes B and/or slide with respect to each other, thanks to the sliding connection between pistons 56 and relative connecting elements 66b; conveyors 40, 41 rotate with respect to each other about respective axes A and/or slide with respect to each other, thanks to the sliding connection between pistons 55 and relative connecting elements 66a; conveyors 40 rotate with respect to opening 31 about respective axes C.

It is important to point out that connecting elements 101, 102 rigidly connect rods 65 of conveyor 41 to cross-bar 110, thus limiting the degrees of freedom of conveying lines 28, 29.

In case of variation of prescribed output line 5 to be fed with separated packages 3, motors 141, 140 are controlled to displace slides 112, 113, in such a way to arrange opening 32 in line with the new prescribed output line 5.

The advantages of distributing system 1 according to the present invention will be clear from the foregoing description.

In particular, each conveyor 41 is free to slide with respect to corresponding conveyors 40, 42.

As a result, conveyors 41, 40, 42 do not define an articulated parallelogram, as in the solution known from EP-A-1439140 and discussed in the introductory part of the present description.

Accordingly, width w of portion 33 of channel 30 is not determined simply by the sloping angle of same portion 33 with respect to direction X.

On the contrary, it is possible to render more constant width w of portion 33 of channel 30 for a wide range of inclination angles of portion 33 with respect to direction X.

In this way, the risk that packages 3 changes their orientation inside portion 33 is substantially reduced.

For the same reasons, the length of portion 33 of channel 30 may be made significantly shorter than the channel of the known solution disclosed in EP-A-1439140; and belt assemblies 47a, 47b may be advantageously made thinner than the belts shown in EP-A-1439140.

The Applicant has also found that width w of portion 33 can be made still more constant for a wide range of inclination angles of portion 33 with respect to direction X, by constraining conveyors 41 to one another by means of connecting elements 101, 102, i.e. by reducing the degrees of freedom of conveyors 41.

In other words, the Applicant has found that width w of portion 33 is made particularly constant for a wide range of inclination angles of portion, by allowing conveyors 41 to slide with respect to conveyors 40, 42 and by constraining conveyors 41 to one another.

In particular, rods 65 are rigidly connected to each other, by connecting elements 100, 101 in the embodiment shown. In this way, width w of stretch 36 of channel 30 is constant.

Furthermore, conveyors 41 are hinged both to respective conveyors 42 and to respective conveyor 40.

In this way, the overall deviation angles of packages 3 along portion 33 of channel 30 is gradually achieved in part at hinges of axes C, in part at hinges of axes A, in part at hinges of axes B and in part at hinges of axes D. As a result of these gradual consecutive rotations, the risk of sensibly altering the orientation of packages 3 inside portion 33 of channel is particularly low.

Moreover, the Applicant has found that by suitably designing conveyors 40, 41, 42, the length of stretches 35, 36, 37, and the radius of at least some of pulleys 51c; 51a; 68b; 68a; 61; 71a; 71b; 81, 82, it is possible to render angles α, β equal to each other and both equal to the half of angle θ, thus ensuring a particularly smooth rotation of packages 3 inside portion 33 and with respect to direction X.

Furthermore, active branches 48 of belt assemblies 47a, 47b are driving branches, i.e. are subjected to a greater tension than driven return branches 49 of belt assemblies 47a, 47b.

This is achieved by connecting motor 143 to pulleys 71a of conveyor 44 which is arranged closer to opening 32 of channel 30 than opening 31 of channel 30.

Accordingly, the tension of branches 48 which cooperate with and pull packages 3 inside channel 30 is greater than in the known solution shown in EP-A-1439140.

Finally, each belt 25 and corresponding belt assembly 47a, 47b define a respective continuous guiding surface S1, S2 for packaging travelling from channel 27 to channel 30.

In this way, even though belts 25 and belt assemblies 47*a*, 47*b* are independently driven from one another, packages 3 are continuously guided from sequencing device 12 to opening 32 of channel 30.

Clearly, changes may be made to distributing system 1 as described herein without, however, departing from the scope of the accompanying Claims.

In particular, distributing system 1 could comprise only conveyors 41, 42 or only conveyors 40, 41.

Furthermore, conveyors 40, 41, 42 could not be belt conveyors, and could comprise, for example, rigid carriers.

The invention claimed is:

1. A distributing system for distributing articles, comprising a channel for conveying said articles and which extends from an input opening to an output opening adapted to output said articles along a first direction;
    said channel comprising:
        a first portion which defines said input opening;
        a second portion which defines said output opening and is articulated with respect to said first portion;
    said output opening being movable along a second direction transversal to said first direction;
    said first portion being arrangeable, in use, sloped relative to said first direction as a result of the movement of said output opening along said second direction;
    a pair of first conveyors and a pair of respective second conveyors which define said first portion of said channel;
    each said first conveyor being free to slide with respect to respective said second conveyor;
    a constraining assembly which comprises constraining means for constraining said first conveyors to each other, and a cross-bar hinged about an axis fixed with respect to said input opening of said channel; and
    said constraining means comprising a pair of constraining elements which are rigidly interposed between said cross-bar and said first conveyors.

2. The distributing system of claim 1, wherein each said first conveyor is also free to rotate with respect to the respective second conveyor.

3. The distributing system of claim 1, comprising first connecting elements interposed between said respective first conveyors and corresponding said second conveyors, and which allow said first conveyors and said respective second conveyors to slide relative to each other;
    said first connecting elements comprising a sliding element articulated onto one of said first conveyor and said second conveyor, and slidable relative to the other of said first conveyor and said second conveyor.

4. The distributing system of claim 3, further comprising:
    at least two first belts which convey, in use, said article inside said first portion of said channel and which are supported by a respective first conveyor, a respective second conveyor and a respective sliding element;
    a plurality of fixed-axes first pulleys which are rotatably fitted to said other of said first conveyor and said second conveyor, and onto which said first belts are wound; and
    at least one movable-axis second pulley, which is rotatably fitted to said sliding element and onto which said first belts are wound.

5. The distributing system of claim 1, comprising a pair of third conveyors which define said first portion of said channel on the opposite side of respective said first conveyors with respect to respective said second conveyors;
    each said third conveyor being free to rotate and/or to slide with respect to respective said second conveyor.

6. The distributing system of claim 3, comprising:
    second connecting elements interposed between said respective first conveyors and corresponding said third conveyors, and which allow said first conveyors and said respective third conveyors to slide relative to each other;
    first hinge axes interposed between respective first conveyors and corresponding said second conveyors, and which allow said first conveyors and said respective second conveyors to rotate relative to each other;
    second hinge axes interposed between respective first conveyors and corresponding said third conveyors, and which allow said first conveyors and said respective third conveyors to rotate relative to each other;
    each said first hinge axes and corresponding said second hinge axes being interposed between respective first connecting element and second connecting element; and
    said constraining means being connected to each said first conveyor in a position interposed between respective said first hinges axes and said second hinge axes.

7. The distributing system of claim 1, comprising:
    a pair of fourth conveyors;
    a pair of fifth conveyors which may slide parallel to said respective fourth conveyors along said first direction and define said output opening; and
    said fourth conveyors and said fifth conveyors conveying, in use, said articles parallel to said first direction and defining said second portion of said channel.

8. The distributing system of claim 7, wherein said constraining assembly further comprises:
    a first slide, which is movable along said second direction relative to said input opening and is connected to said fourth conveyors; and
    a second slide, which is movable along said first direction relative to said first slide, is integrally movable together with said first slide along said second direction, and is connected to said fifth conveyors.

9. The distributing system of claim 8, wherein said constraining assembly further comprises a third slide hinged to said cross-bar and mounted in a slidable way along said first direction with respect to said first slide.

10. The distributing system of claim 8, comprising:
    a first motor operable to move said first slide along said second direction together with said second slide, so as to move together said fourth conveyors and said fifth conveyors along said second direction;
    a second motor operable to move said second slide relative to said first slide along said first direction, so as to move said fifth conveyors along said first direction with respect to said fourth conveyors; and
    said first motor and/or said second motor being carried by said constraining assembly.

11. The distributing system of claim 7, wherein said constraining assembly comprises:
    a third motor; and
    a pair of joints functionally interposed between said third motor and respective driven members of said fourth conveyors.

12. The distributing system of claim 1, wherein said constraining assembly extends above said channel.

13. The distributing system of claim 1, comprising:
    at least one first belt assembly which cooperates, in use, with said articles travelling inside said channel; and
    at least one second belt assembly which cooperates, in use, with said articles travelling inside said channel;

said first belt assembly being associated to one of said first conveyors and to one of said second conveyors;

said second belt assembly being associated to the other one of said first conveyors and to the other one of said second conveyors; and said first belt assembly and said second belt assembly having respective driving branches cooperating, in use, with said articles.

14. A unit for transferring articles from a single input line to a plurality of output lines, comprising:

an active sixth conveyor which advances, in use, said articles from said input line to a prescribed said output line;

a sequencing device arranged between said input line and said output lines and adapted to generate a row of articles separated by a gap; and a distributing system according to claim 1 for distributing said articles from said input line to said prescribed output line.

15. The unit of claim 14, wherein said sequencing device comprises:

at least one second belt and at least one third belt which cooperate, in use, with said article upstream of said input opening of said channel and inside said sequencing device;

said second belt and said third belt being wound about a respective pulley carried by respective first conveyors;

said unit comprising a first and a second continuous guiding surface for said article travelling inside sequencing device and said channel up to said output opening;

said first continuous guiding surface being defined by said second belt and said first belt assembly; and said second continuous guiding surface being defined by said third belt and said second belt assembly.

16. A distributing system for distributing articles, comprising a channel for conveying the articles and which extends from an input opening to an output opening adapted to output the articles along a first direction;

the channel comprising:

a first portion which defines the input opening;

a second portion which defines the output opening and is articulated with respect to the first portion;

the output opening being movable along a second direction transversal to the first direction;

the first portion being arrangeable, in use, sloped relative to the first direction as a result of the movement of the output opening along the second direction;

a pair of first conveyors and a pair of respective second conveyors which define the first portion of the channel, the pair of first conveyors being configured to rotate relative to the pair of second conveyors as the output opening moves along the second direction;

each of the first conveyors being free to slide with respect to a respective one of the second conveyors;

the first conveyors being fixedly connected to one another by a common support such that the first conveyors move in fixed relation to one another when the pair of first conveyors rotates relative to the pair of second conveyors; and the common support extending from a first end of the common support to a second end of the common support, and the common support being pivotable at the first end and pivotable at the second end.

17. The distributing system of claim 16, wherein the first end of the support is fixed with respect to the input opening of the channel, the second end of the support is fixed with respect to the output opening of the channel, the input opening of the channel is closer to the first end than to the second end, and the output opening of the channel is closer to the second end than to the first end.

18. A distributing system for distributing articles, comprising a channel for conveying the articles and which extends from an input opening to an output opening adapted to output the articles along a first direction;

the channel comprising:

a first portion which defines the input opening;

a second portion which defines the output opening and is articulated with respect to the first portion;

the output opening being movable along a second direction transversal to the first direction;

the first portion being arrangeable, in use, sloped relative to the first direction as a result of the movement of the output opening along the second direction;

a pair of first conveyors and a pair of respective second conveyors which define the first portion of the channel, the pair of first conveyors configured to rotate relative to the pair of second conveyors as the output opening moves along the second direction, the channel possessing a width between the first conveyors; and each of the first conveyors being free to slide with respect to a respective one of the second conveyors such that the width of the channel between the first conveyors remains constant when the pair of first conveyors rotates relative to the pair of second conveyors over a range of inclination angles between the pair of first conveyors and the pair of second conveyors.

* * * * *